United States Patent
God et al.

(10) Patent No.: US 10,421,550 B2
(45) Date of Patent: Sep. 24, 2019

(54) AUTARKIC MONUMENT IN AN AIRCRAFT PRESSURE CABIN WITH DECENTRALIZED OPERATING MEDIUM SUPPLY AND EFFICIENT ENERGY CONVERSION

(75) Inventors: Ralf God, Hamburg (DE); Christian Kurz, Hamburg (DE); Andreas Westenberger, Buxtehude (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 1121 days.

(21) Appl. No.: 13/574,964

(22) PCT Filed: Jan. 24, 2011

(86) PCT No.: PCT/EP2011/000275
§ 371 (c)(1),
(2), (4) Date: Oct. 12, 2012

(87) PCT Pub. No.: WO2011/089016
PCT Pub. Date: Jul. 28, 2011

(65) Prior Publication Data
US 2013/0210329 A1    Aug. 15, 2013

(30) Foreign Application Priority Data
Jan. 25, 2010  (DE) .......... 10 2010 005 695

(51) Int. Cl.
*B64D 13/02* (2006.01)
*B64D 11/02* (2006.01)
(Continued)

(52) U.S. Cl.
CPC .............. *B64D 13/02* (2013.01); *B64D 11/02* (2013.01); *B64D 11/04* (2013.01);
(Continued)

(58) Field of Classification Search
CPC ......... G06F 17/00; B64D 13/02; B64D 11/02; B64D 11/04; B64D 2011/0076
(Continued)

(56) References Cited

U.S. PATENT DOCUMENTS 2,973,823 A * 3/1961 Stentz .................... B60P 3/025
180/11
5,074,496 A * 12/1991 Rezag ................... B64D 11/04
105/327
(Continued)

FOREIGN PATENT DOCUMENTS

DE   10 2006 002 882 A1   8/2007
GB         2430118 A1      6/2008
(Continued)

OTHER PUBLICATIONS

International Preliminary Report on Patentability dated Aug. 16, 2012 in corresponding application No. PCT/EP2011/000275.
(Continued)

*Primary Examiner* — Steven B McAllister
*Assistant Examiner* — Samantha Probst
(74) *Attorney, Agent, or Firm* — Carter, DeLuca & Farrell LLP (57) ABSTRACT

An autarkic monument in an aircraft pressure cabin supplied with the required operating mediums in a decentralized fashion by carrying along these operating mediums in the monument in operating medium reservoirs is provided. Methods for the efficient energy conversion within this autarkic monument are also provided. The efficiency is achieved such that the energy conversion is, based on the operating mediums, optimized with respect to exergo-economic and/or exergo-ecologic aspects, and such that energy conversion processes are adapted to one another if several energy conversion processes take place.

8 Claims, 3 Drawing Sheets

(51) Int. Cl.
*B64D 11/04* (2006.01)
*B64C 27/82* (2006.01)
*B64D 11/00* (2006.01)
*B64D 41/00* (2006.01)

(52) U.S. Cl.
CPC ............... *B64C 2027/8236* (2013.01); *B64D 2011/0076* (2013.01); *B64D 2041/005* (2013.01); *Y02T 90/36* (2013.01)

(58) Field of Classification Search
USPC .................................................. 454/71; 3/71
See application file for complete search history.

(56) References Cited

U.S. PATENT DOCUMENTS

| | | | | |
|---|---|---|---|---|
| 5,285,604 | A * | 2/1994 | Carlin | B60P 3/14 52/143 |
| 5,513,500 | A | 5/1996 | Fischer | |
| 6,015,341 | A * | 1/2000 | Faraj | 454/307 |
| 6,459,175 | B1 * | 10/2002 | Potega | 307/149 |
| 6,863,827 | B2 * | 3/2005 | Saraceno | C02F 9/005 210/241 |
| 6,945,052 | B2 * | 9/2005 | Frutschi et al. | 60/772 |
| D575,843 | S * | 8/2008 | Werner | D23/207 |
| 7,429,190 | B2 | 9/2008 | Hueber | |
| 7,823,834 | B2 * | 11/2010 | French | B64C 1/1469 244/129.4 |
| 7,878,453 | B2 * | 2/2011 | Liggett | B64B 1/14 244/126 |
| 7,954,761 | B2 * | 6/2011 | Johnson | A47B 31/02 244/118.5 |
| 7,984,874 | B2 | 7/2011 | Diergardt | |
| 8,025,252 | B2 | 9/2011 | Hupperich et al. | |
| 8,087,611 | B2 * | 1/2012 | Arnold | B64D 11/04 244/118.1 |
| 8,387,916 | B2 * | 3/2013 | Baatz | B64D 11/0007 244/118.1 |
| 8,734,951 | B2 * | 5/2014 | Rukavina et al. | 428/423.1 |
| 8,808,537 | B1 * | 8/2014 | Livingston | C02F 9/005 210/196 |
| 8,814,086 | B2 * | 8/2014 | Tran | B64D 11/04 244/118.5 |
| 8,814,087 | B2 * | 8/2014 | Koschberg | B64D 11/04 244/118.5 |
| 8,944,376 | B2 * | 2/2015 | Godecker | B64D 11/04 244/118.5 |
| 9,188,380 | B2 * | 11/2015 | Lu | G05D 23/00 |
| 9,238,398 | B2 * | 1/2016 | Lu | B60H 1/00592 |
| 9,382,005 | B2 * | 7/2016 | Schliwa | B64D 11/00 |
| 9,387,932 | B2 * | 7/2016 | Lee | B64D 11/04 |
| 9,422,057 | B2 * | 8/2016 | Koschberg | B64D 11/04 |
| 2004/0108752 | A1 * | 6/2004 | Rajasingham | 296/189 |
| 2005/0158041 | A1 | 7/2005 | Hoehne et al. | |
| 2007/0110861 | A1 * | 5/2007 | Hoffjann | A47J 27/04 426/412 |
| 2007/0111066 | A1 | 5/2007 | Hoffjann et al. | |
| 2008/0086946 | A1 * | 4/2008 | Weimer et al. | 48/89 |
| 2008/0127411 | A1 | 6/2008 | Hoffjann et al. | |
| 2008/0178609 | A1 | 7/2008 | Hoffjann et al. | |
| 2009/0157234 | A1 * | 6/2009 | Breit | B64C 13/50 701/3 |
| 2009/0230924 | A1 * | 9/2009 | Wright | H02N 2/181 320/148 |
| 2009/0274985 | A1 * | 11/2009 | McKnight et al. | 431/36 |
| 2009/0301120 | A1 * | 12/2009 | Godecker | F25D 15/00 62/239 |
| 2009/0321090 | A1 * | 12/2009 | Bleil et al. | 169/46 |
| 2010/0018723 | A1 * | 1/2010 | Bleil et al. | 169/45 |
| 2010/0072759 | A1 * | 3/2010 | Andosca | H02N 2/188 290/1 R |
| 2010/0078019 | A1 * | 4/2010 | Rittner et al. | 128/202.26 |
| 2010/0148519 | A1 * | 6/2010 | Shih | H01L 41/1136 290/1 R |
| 2010/0178863 | A1 * | 7/2010 | Coward | 454/333 |
| 2010/0193629 | A1 * | 8/2010 | Breit | B64D 11/02 244/58 |
| 2010/0233552 | A1 * | 9/2010 | Knepple | B64D 11/04 429/420 |
| 2010/0308190 | A1 | 12/2010 | Tkocz | |
| 2010/0319742 | A1 * | 12/2010 | Prusmack | B60P 3/34 135/88.13 |
| 2011/0265474 | A1 * | 11/2011 | Schubert | 60/641.9 |
| 2012/0169064 | A1 * | 7/2012 | Hoffman | B64D 41/00 290/1 R |
| 2013/0210329 | A1 * | 8/2013 | God et al. | 454/71 |

FOREIGN PATENT DOCUMENTS

| | | |
|---|---|---|
| WO | 2005120069 A2 | 12/2005 |
| WO | 2009046805 A1 | 4/2009 |

OTHER PUBLICATIONS

International Search Report for Appln. No. PCT/EP2011/000275 dated Aug. 11, 2011.
European Office Action issued in corresponding application No. 11 702 930.6 dated Feb. 10, 2016.
European Office Action issued in corresponding application No. 11 702 930.6 dated Sep. 26, 2017, 4 pages.

* cited by examiner

AUTARKIC MONUMENT IN AN AIRCRAFT PRESSURE CABIN WITH DECENTRALIZED OPERATING MEDIUM SUPPLY AND EFFICIENT ENERGY CONVERSION

BACKGROUND

The invention pertains to an autarkic, self-supplying and self-sustaining monument in an aircraft pressure cabin that is supplied with the operating mediums required for its operation in a decentralized fashion by carrying along these operating mediums in the monument in operating medium reservoirs. The autarkic monument may be installed in the passenger area, as well as in the cargo compartment. The invention furthermore pertains to a method for the efficient energy conversion within the autarkic monument. According to the characteristics of this method, the energy conversion processes that take place in the monument and are based on the operating mediums carried along are optimized and adapted to one another with respect to exergetic, economic and ecologic aspects, i.e., with respect to exergo-economic and exergo-ecologic aspects.

In this context, exergo-economic and exergo-ecologic respectively mean a combination of economic or ecologic observation and exergy analysis. In contrast to conventional energy consumption analyses, the exergy analysis makes it possible to optimize a system in such a way that it has a minimal operating medium consumption with respect to its process function and optimally utilizes and converts energy forms present in the system.

Monuments are large integral components installed in an aircraft pressure cabin. These monuments include, for example, the galleys, rest compartments for the flight or cabin crew, bar and reception areas, installations for the on-board entertainment, as well as toilets, showers and lavatories. It is known that a monument of this type needs to be provided with a mechanical mounting device in order to install this monument in the cabin. This is usually realized on the seat rails in the floor, as well as on other mounting points provided in the aircraft fuselage for this purpose. In order to flexibly position the monument, its mounting is realized in a detachable fashion such that a fast and simple conversion of the cabin is ensured (DE 202008003772 U1, DE 602005006280 T2).

However, if operating mediums need to be supplied to the monument, the flexibility with respect to its positioning in the cabin is significantly limited because supply lines and connections cannot be planned, installed and connected to the monument with unrestricted flexibility. For example, a chain device for guiding an electric connecting cable (DE 102007003802 B4) represents one known approach for flexibly positioning a monument with operating medium supply.

It would also be conceivable to guide a data cable by means of such a chain device. A monument needs to be connected to data cables, for example, in order to control and parameterize its functions via the cabin network, as well as for transmitting and exchanging data and signals with other systems in the aircraft. A self-configuring radio network in the cabin (GB 2430118 A, WO 2005 120069 A2) represents one known approach for realizing a flexibilisation of the data link of a monument. In this case, the data is transmitted in a wireless fashion, for example, between a passenger service unit (PSU) or a router of the on-board entertainment system and a group of passenger seats such that groups of seats can be flexibly and freely configured with respect to their data link.

In the cabin of a modern passenger aircraft, electric energy represents an important and therefore preferred operating medium for supplying monuments because it can be easily generated, distributed in a nearly lossless fashion and converted into practically any other form of energy. The generation of electric energy takes place on the aircraft engine by means of a generator due to the conversion of shaft power into an electric current. The current is subsequently transported from the generator to be monuments in the cabin via a central main distributor and a distribution network.

In order to exploit the known advantages of utilizing electric energy as operating medium, namely the nearly lossless distribution and the simple optional conversions into other energy forms, a complex distribution network that originates at a central location and has a hierarchic structure is nowadays required in aircraft for this operating medium. The distribution in the network takes place in a cable-bound fashion and therefore allows only little flexibility. In addition, a thusly structured distribution network results in a high cable weight and high installation expenditures.

For example, one known approach that counteracts these negative effects is the utilization of the seat rails in the floor for the power supply of a monument mounted thereon (DE 102004039189 A1). In this case, an electric potential is applied to the seat rail by means of a conductor and can be tapped on the seat rail at any point with a second conductor. However, this approach does not make it possible to transmit an arbitrarily high power and the distribution network still originates at a central location.

Electric energy can also be transmitted to power consumers in a contactless fashion, but such a contactless transmission also does not provide any significant advantages in comparison with the known approaches that utilize a chain device (DE 102007003802 B4) or the seat rails (DE 102004039189 A1) because the contactless transmission link can only have a length of a few centimeters. Consequently, an advantageous flexibilisation of the operating medium supply cannot be achieved and the distribution network in this case also needs to originate at a central location and be organized hierarchically.

Figure 4:
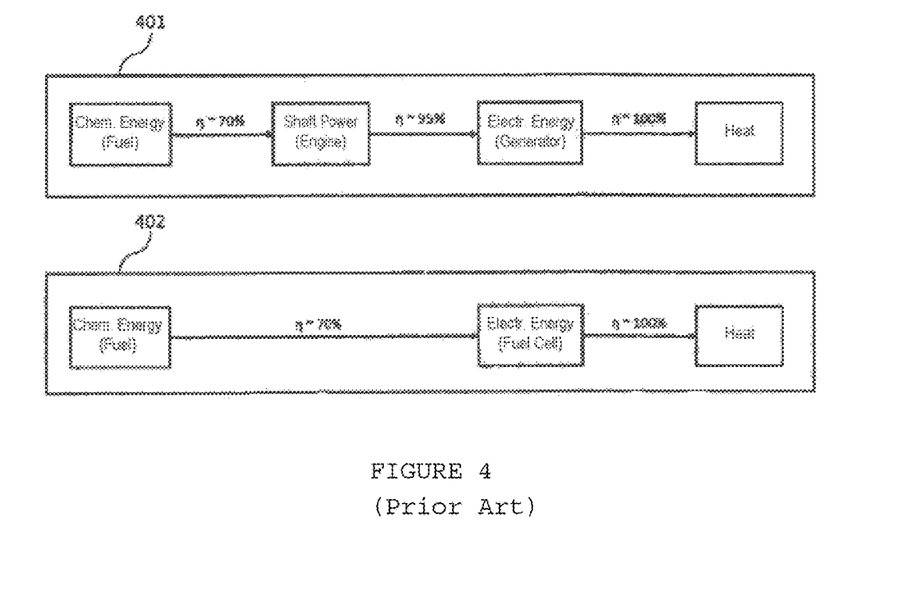
FIG. 4 shows energy conversion chains with different efficiency (prior art).

In addition to these disadvantages associated with the distribution of electric energy in aircraft, other disadvantages result from the fact that the entire energy conversion chain does not represent an efficient energy conversion process with respect to exergo-economic aspects, wherein this is elucidated with reference to the exemplary illustration in FIG. 4: in order to generate heat in a monument in an aircraft pressure cabin, the fuel kerosene is nowadays converted into shaft power in the engine and then converted into electric energy by means of a generator connected to the shaft. This electric energy is subsequently used 401 for generating heat, for example, in an oven. In this case, the energy conversion efficiency is primarily limited by the efficiency $\eta$ of the engine that, according to the laws of thermodynamics, can maximally reach the theoretic Carnot efficiency $\eta_c$. The efficiencies are more favorable and a more efficient energy conversion results if electric energy is generated from a fuel, for example, by means of a fuel cell and subsequently converted 402 into heat.

For example, a galley monument is conventionally used in aircraft. This monument is not relevant for the safe and reliable operation of the aircraft and requires the largest amount of energy of all aircraft and cabin systems. This energy is supplied to the monument in the form of an electric current and occasionally also an additional operating medium in the form of a coolant for refrigeration purposes (DE 4340317 A1). One disadvantage of such an energy supply is that it requires correspondingly configured supply lines that cannot be flexibly planned and realized with respect to their distribution network architecture. Due to its high energy demand, this monument continues to disadvantageously influence the design of other aircraft components required for power generation and cooling purposes, as well as the corresponding distribution networks.

A method for making available energy and a supply unit designed in the form of a galley trolley or a luggage or cargo container were developed (WO 2009/046805 A1) in order to counteract this known disadvantage. Since this unit is equipped with a fuel cell including its fuel supplies, electric energy can be made available in a decentralized fashion. In this case, however, it is very disadvantageous that this electric energy is used for powering heating and/or cooling units in the next step. In terms of the energy conversion processes described above and illustrated in FIG. 4, a large portion of the chemical energy contained in the fuel remains unused in this method.

It therefore is the objective of the invention to realize an autarkic monument in such a way that it can operate in a self-sustaining fashion, wherein operating mediums to be carried along are chosen such that efficient energy conversion processes result for the functions of the monument to be fulfilled and/or that a high overall efficiency of the interlinked energy conversion processes results within the autarkic monument.

SUMMARY

This objective is attained within an autarkic monument with the characteristics of Claim 1 and with a method with the characteristics of Claim 9.

According to the invention, an autarkic moment is realized in such a way that the operating mediums required for its operation can be carried along in a decentralized fashion and at least one operating medium allows a direct energy conversion process. Operating medium reservoirs are provided in the monument in order to carry along or make available the operating mediums and replenished with the corresponding operating medium supplies during the loading of the aircraft on the ground. In this way, supply networks that originate at a central location and connections for operating mediums can be eliminated on such a monument in an aircraft pressure cabin. A required simple and flexible installation of the monument in the cabin therefore can be achieved. According to the invention, the monument represents an autarkic and self-supplying unit that is merely connected to the aircraft structure by means of a mechanical mounting. If so required, the monument can exchange data in a contactless fashion via a radio data link. The inventive solution allows a minimal operating medium consumption due to the skillful choice of operating mediums for efficiently utilizing the energy forms contained in these operating mediums and/or due to the favorable interlinking of energy conversion processes for achieving a high overall efficiency within an autarkic monument such as, for example, a galley. This has a positive repercussion on the balance of usable energy in the entire aircraft system.

The inventive solution allows an optimal energy balance, in particular, if the required energy forms can be or are obtained from the operating mediums carried along by means of exergo-economically and/or exergo-ecologically optimized conversion processes.

According to an aspect of the invention, an operating medium reservoir for the fuel methanol and another operating medium reservoir for a coolant in the form of liquid air are carried along for a monument, for example, in which heating, cooling and illuminating functions are required. Heat for heating purposes can be generated from the operating medium methanol with high energy conversion efficiency ($\eta \sim 100\%$) in a direct energy conversion process such as a combustion process, e.g., in a catalytically operated oven. The same operating medium methanol can also be converted into electric energy in a fuel cell and used for illuminating the monument. For example, if light-emitting diodes are used as lamps for illuminating the monument, the conversion of electric energy into light can take place with better conversion efficiency ($\eta \sim 25\%$) than in the case of incandescent lamps ($\eta$ only about 5%) because the latter convert a larger portion of the electric energy into heat that cannot be used for illumination purposes. Heat can be absorbed with the operating medium liquid air in order to cool individual areas of the monument. This operating medium is converted into gaseous air during this process and heat is absorbed with high conversion efficiency. The liquefaction of the air or a cryogenic gas may take place on the ground outside the aircraft. With respect to the energy contained in the operating medium liquid air, this conversion process aboard an aircraft is very efficient in comparison with the absorption of heat by means of electric energy and a refrigerating machine.

A favorable linking of energy conversion processes in the autarkic monument is also proposed in order to minimize the energetic losses in the form of anergy during the operation of the monument. When using liquid air for cooling purposes, for example, the gaseous air being created can be additionally utilized during the combustion of a fuel in order to generate heat. Due to the skillful choice of the operating mediums carried along in the monument in a decentralized fashion, in this case liquid air and methanol, and due to the linking of energy conversion processes, in this example heating and cooling, altogether efficient energy conversion processes and independence from the aircraft supply networks originating at a central location are achieved.

According to an aspect of the invention, a favorable linking of energy conversion processes is achieved in that the energy demands of individual subsystems of the autarkic monument are monitored and controlled, and in that energy converters are used as subsystems that can convert energy in accordance with one or more technical principles. For this purpose, the subsystems are equipped, for example, with a sensor system for controlling the energy conversion. The data acquired by the sensor system is centrally processed in the monument and used for optimally controlling and routing the energy fluxes between the subsystems. Hybrid energy converters also are advantageously used as subsystems that can generate an energy form in accordance with two or more technical principles. For example, if an oven subsystem is realized in the form of a hybrid energy converter with catalytic heating, electric heating and a heat pump, such a subsystem has a total of three options for heating meals. Heat can be supplied to the meals in this oven, for example, by catalytically generating this heat from an operating medium or generating said heat from electric energy supplied by another subsystem in an electric resistance heater. If heat that is not needed by other subsystems is available, the meals can ultimately also be heated by transporting the heat of the subsystems to the oven by means of a heat pump. All in all, a favorable linking of energy conversion processes is achieved in that the energy converters in the autarkic monument can communicate with one another via data links and convert energy on demand in accordance with two or more principles, and in that the energy fluxes between the subsystems can be controlled and routed on the basis of the communicated data.

According to another aspect of the invention, the overall efficiency of a monument can be improved with other energy conversion techniques. For example, electric energy can be obtained from heat converted in the monument based on the thermoelectric effect. In the region of the floor or the seats, electric energy can furthermore be obtained from mechanical work performed by the passenger or the crew based on the piezoelectric effect. These methods represent other building blocks for an exergo-economic optimization of a monument.

According to another aspect of the invention, the operating medium water may also be carried along in the monument in a decentralized fashion or produced in the monument during the generation of heat, for example, by means of catalytic combustion of hydrogen. Other methods for producing water in thermal or electrochemical energy conversion processes are generally known and may be integrated into the autarkic monument in accordance with an exergo-economic and/or exergo-ecologic optimization.

Other advantageous exemplary embodiments form the objects of further dependent claims.

BRIEF DESCRIPTION OF THE DRAWINGS

The invention is described in greater detail below with reference to preferred exemplary embodiments that are illustrated in the attached drawings. At this point, it should be emphasized that the embodiments of the invention illustrated in the figures merely elucidate the invention in a purely exemplary fashion and should, in particular, not be interpreted in a restrictive sense with respect to the scope of protection of the invention.

In the individual drawings.

DETAILED DESCRIPTION

Figure 1A:
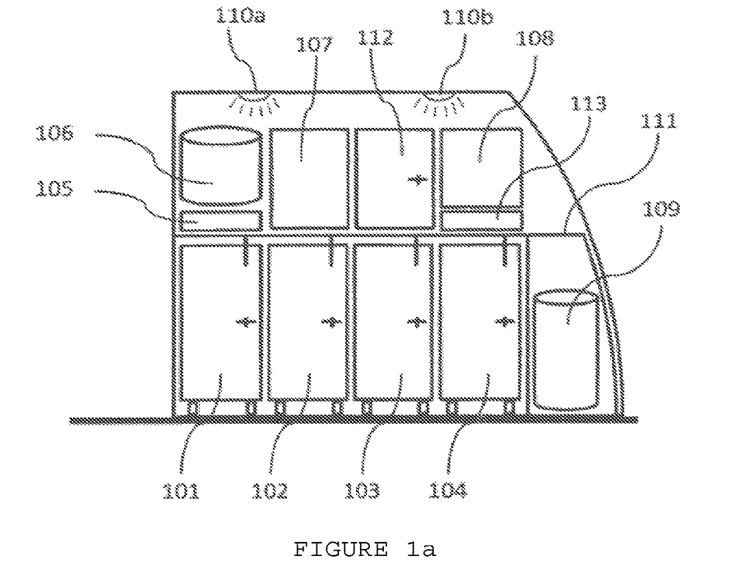
FIG. 1a shows an autarkic galley monument.

FIG. 1a shows an autarkic galley monument that carries along the operating mediums according to Claim 1 required for a self-sustaining operation in a decentralized fashion. This monument comprises the galley trolleys 101, 102, 103, 104 that have standardized dimensions, but different functionalities. A refrigerated galley trolley 101 that is loaded, for example, with cold beverages is supplied by a cooling unit 105. The cooling unit 105 is connected to an operating medium reservoir 106 that is filled with cryogenic air via a correspondingly designed (not-shown) connecting line. The cryogenic air withdrawn from the operating medium reservoir 106 is evaporated in the cooling unit 105, i.e., converted into gaseous air. The heat required for this energy conversion process is absorbed from the galley trolley 101 by means of thermal conduction. Another part of the heat is absorbed from a second galley trolley 102 that is loaded, for example, with precooked meals to be refrigerated. In this case, it would also be conceivable to realize one of the galley trolleys 101, 102, 103, 104 itself in the form of an operating medium reservoir with cooling unit that supplies the other galley trolleys or to integrate a separate operating medium reservoir and a cooling unit that can be used in case of need into each of the galley trolleys 101, 102, 103, 104.

It would be conceivable that a galley trolley 103 features an integrated, electrically operated press for compacting the trash accumulating during the flight. The electric energy required for the brief operation is delivered by an accumulator 107 that is continuously recharged with electric energy generated in a methanol fuel cell 108. This methanol fuel cell is connected to the operating medium reservoir 109 filled with methanol via a (not-shown) fuel line. The electric energy generated by the fuel cell 108 is furthermore used, for example, for continuously supplying the illumination elements 110a, 110b of the galley monument with electric energy in order to illuminate the work surface 111.

Figure 1B:
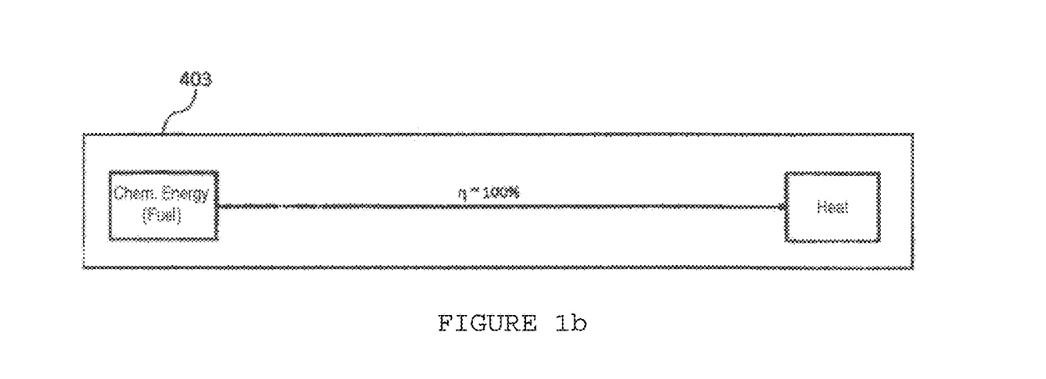
FIG. 1b shows a direct energy conversion process.

A catalytically operated oven, namely a so-called catalytic oven 112, is installed in the galley monument in order to heat up meals during the flight and also supplied by the operating medium reservoir 109 via a corresponding (not-shown) connecting line. The fuel from the operating medium reservoir 109 is converted into heat by means of catalytic combustion (see direct energy conversion process in FIG. 1b). The oxidant required for this process may consist, e.g., of the cabin air or preferably the gaseous air from the cooling unit 105 accumulating during the cooling process.

The galley trolley 104 may serve for preheating the refrigerated meals before they are heated to consumption temperature in the oven 112. For this purpose, the trolley 104 is connected to a correspondingly designed heat exchanger 113. This heat exchanger conducts the heat generated during the continuous operation of the fuel cell 108 into the trolley 104 meals. In this way, the fuel cell 108 is advantageously cooled during its operation and the meals are simultaneously preheated.

Figure 2:
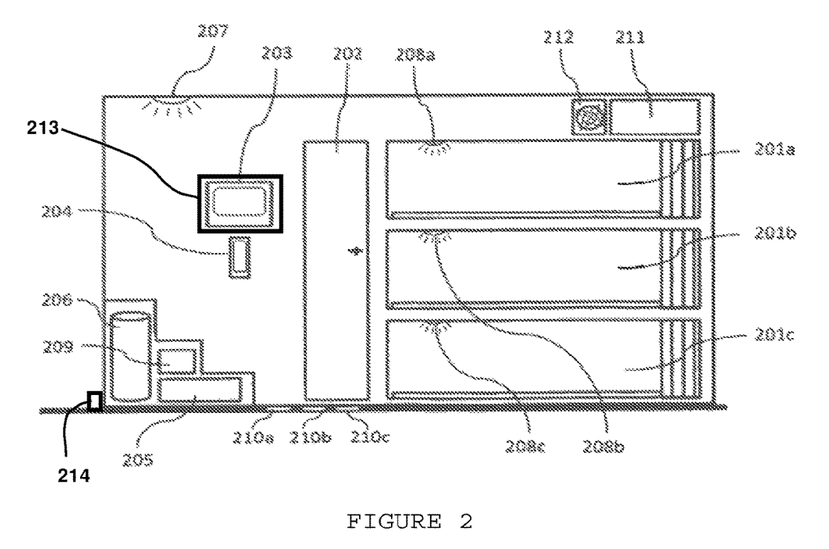
FIG. 2 shows an autarkic rest compartment for the cabin crew.

FIG. 2 shows a monument in the form of an autarkic rest compartment for the cabin crew that carries along the operating mediums according to Claim 1 required for a self-sustaining operation in a decentralized fashion. The rest compartment is equipped with several berths 201a, 201b, 201c for the cabin crew. A storage cabinet 202 is available to each member of the cabin crew for personal object. The autarkic rest compartment features a control station with a monitor 203 for monitoring and controlling the cabin systems, as well as an on-board telephone 204, both of which communicate with the cabin network via a wireless radio link.

In this example, a hydrogen fuel cell 205 situated underneath the stairway of the rest compartment delivers the electric energy required for its operation. The fuel cell is supplied with hydrogen and oxygen by an operating medium reservoir 206 realized in the form of easily exchangeable pressure cylinders via correspondingly designed (not-shown) connecting lines. In addition to the control station with the monitor 203 and the on-board telephone 204, the illumination system 207 is also supplied with the required energy by the fuel cell 205. The water being created in the fuel cell is also used for air humidification in the rest compartment. The reading lamps 208a, 208b, 208c of the berths 201a, 201b, 201c are supplied with electric energy by an accumulator 209. This accumulator is recharged by a (not-shown) thermoelectric energy converter that is incorporated into the mattresses and converts the body heat of the crewmember resting thereon into an electric current (direct energy conversion process). The accumulator 209 is also recharged by piezoelectric elements 210a, 210b, 210c that are incorporated into the floor and convert mechanical work performed by stepping on these piezoelectric elements into an electric current. The charging and recharging of this accumulator 209 may furthermore be realized with the fuel cell unit 205.

An air conditioner 211 continuously delivers conditioned breathing air that is uniformly distributed in the autarkic rest compartment by a connected air distributor 212. The electric supply of this system is also realized by means of the fuel cell unit 205. The replacement of carbon dioxide in the breathing air of the rest compartment with oxygen is based on known chemical principles and realized with chemicals that are carried along in an operating medium reservoir in the air conditioner 211. Due to this air conditioning method, the temperature control can be carried out exergo-economically. Consequently, the autarkic monument does not require any supply lines for data, electricity and air-conditioning that are permanently connected to the monument for its operation.

Figure 3:
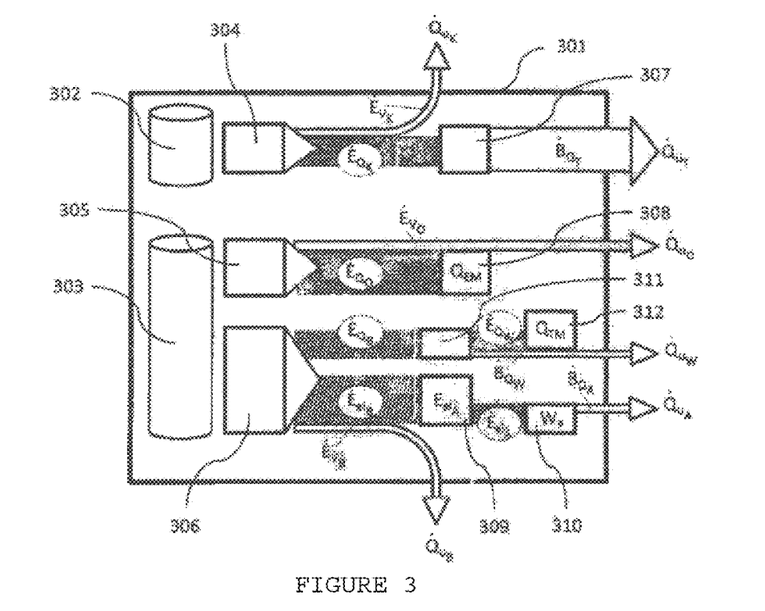
FIG. 3 shows a flow chart of a method for the efficient energy conversion in an autarkic galley monument.

FIG. 3 shows a flow chart of a method for the efficient energy conversion within the predefined system boundary 301 of an inventive monument such as, for example, the autarkic galley monument described with reference to FIG. 1a. In this case, the energy fluxes illustrated in the figure should be interpreted in a qualitative fashion and merely serve for elucidating the individual steps of the method.

According to the second fundamental law of thermodynamics, energy consists of a portion that is referred to as exergy and can be completely converted into work and a portion that is referred to as anergy and cannot be converted into work. The method described below therefore comprises steps for the efficient energy conversion with the aid of exergy analyses for optimization purposes. In this case, the amount of usable exergy produced is maximized and the portion of unusable anergy is correspondingly minimized.

In a first step, the method comprises the supply of two operating mediums in operating medium reservoir 302, 303 provided for this purpose. In the example of the galley monument, the operating medium reservoir 302 represents a tank with cryogenic air and the operating medium reservoir 303 represents a tank with methanol. In a second step, three energy converters 304, 305, 306 connected to the respective energy medium reservoirs are supplied with the required operating mediums via correspondingly designed (not-shown) connecting lines. In the described example, a cooling unit 304 generates the exergy flux $\dot{E}_{QK}$, as well as the anergy flux $\dot{E}_{VK}$ that cannot be further utilized in the system and is created from the losses during the energy conversion in the cooling unit 304, from the supplied operating medium in a third step. $\dot{E}_{QK}$ represents the exergy flux required for removing a quantity of heat that corresponds to the anergy flux $\dot{B}_{Q_T}$ from the galley trolley 307 to be refrigerated. According to the invention, all steps, operating mediums and energy converters in this process chain are chosen such that the anergy flux $\dot{E}_{VK}$ is minimized with respect to the function to be fulfilled by the process.

At a different location, an oven 305 generates a heat flow within the system boundary 301 from methanol supplied by the operating medium reservoir 303, namely by means of catalytic combustion. This heat flow is transported into the meals arranged on the oven racks 308 in the form of the usable exergy flux $\dot{E}_{QO}$ and stored therein in the form of heat $Q_{EM}$. The anergy flux $\dot{E}_{VO}$ that cannot be further utilized in the system is created due to losses occurring during this transport process.

The fuel cell 306 is also supplied by the methanol tank 303 and generates the exergy flux $\dot{E}_{elB}$ in the form of an electric current, as well as the anergy flux $\dot{E}_{VB}$ created due to losses occurring in the fuel cell 306 during the energy conversion, e.g., due to inadvertent diffusion of the fuel through the fuel cell membrane or due to ohmic losses. The exergy flux $\dot{E}_{elB}$ is now stored in an accumulator 309 in the form of electrochemical energy $E_{elA}$. Part of this energy $E_{elA}$ is subsequently supplied to an electrically operated trash compactor 310 in the form of the exergy flux $\dot{E}_{elA}$ and performs the plastic deformation work $W_P$ required for compacting the trash accumulating during the flight. This also creates unusable heat that is represented by the anergy flux $\dot{B}_{Q_A}$. The other part of the electrochemical energy stored in the accumulator 309 is available for other applications such as, for example, the operation of the (not-shown) lamps of the galley monument.

Heat accumulating during the operation of the fuel cell 306 is transported to a heat exchanger 311 in the form of the exergy flux $\dot{E}_{QB}$. In the heat exchanger 311, this exergy flux is divided into the exergy flux $\dot{E}_{QW}$ and the anergy flux $\dot{B}_{Q_W}$ that cannot be further utilized in the system. The exergy flux $\dot{E}_{QW}$ is subsequently transported into the galley trolley 312 and stored in the meals arranged therein in the form of heat $Q_{TM}$.

All anergy fluxes that exceed the system boundary 301 of the galley monument consist of thermal energy that cannot be further utilized in the system. They can be combined into the overall heat flow $\dot{Q}_u$ that is released into the immediate vicinity by the galley monument. $\dot{Q}_u$ is composed of the waste heat flow $\dot{Q}_{u_K}$ of the cooling unit 304, the heat flow $\dot{Q}_{u_T}$ removed from the galley trolley 307, the waste heat flow $\dot{Q}_{u_O}$ of the oven 305, the waste heat flow $\dot{Q}_{u_B}$ of the fuel cell 306, the heat flow $\dot{Q}_{u_A}$ of the trash compactor 309 and the heat flow $\dot{Q}_{u_W}$ of the heat exchanger 311. According to Claim 2, an inventive autarkic monument is designed in such a way that this overall heat flow $\dot{Q}_u$ is minimized.

A modular design of the cabin that allows a flexible and simple installation of the cabin monuments is desired in modern commercial aircraft. With respect to the arbitrary positioning of monuments in the cabin, as well as their simple installation and removal, the operating medium supply that originates at central locations in the aircraft and is structured in a strictly hierarchic fashion so far represented a significant obstacle because supply lines and connections cannot be planned, installed and connected to the monument with unrestricted flexibility.

The invention therefore pertains to an autarkic monument in an aircraft pressure cabin that is supplied with the required operating mediums in a decentralized fashion by carrying along these operating mediums in the monument in operating medium reservoirs. The invention furthermore pertains to a method for the efficient energy conversion within this autarkic monument. The efficiency is achieved in that the energy conversion is, based on the operating mediums, optimized with respect to exergo-economic and/or exergo-ecologic aspects, and in that energy conversion processes are adapted to one another if several energy conversion processes take place.

In connection with known methods for the flexibilisation of the monument installation that can be improved, e.g., due to mechanical flexibilisation of the mounting or a radio data link, the invention makes it possible to realize a monument that is completely autarkic with respect to the operating medium supply and therefore can be arbitrarily positioned, as well as easily installed and removed, wherein said monument supplies and sustains itself by means of exergo-economically and/or exergo-ecologically optimized energy conversion processes.

LIST OF REFERENCE SYMBOLS

101 Refrigerated galley trolley
102 Refrigerated galley trolley

103 Electrically operated galley trolley
104 Galley trolley supplied with heat
105 Cooling unit
106 Operating medium reservoir
107 Accumulator
108 Fuel cell
109 Operating medium reservoir
110 Illumination element
111 Work surface
112 Catalytic oven
113 Heat exchanger
201 Berth
202 Storage cabinet
203 Control station with monitor
204 On-board telephone
205 Fuel cell
206 Operating medium reservoir
207 Illumination system
208 Reading lamp
209 Accumulator
210 Piezoelectric element
211 Air conditioner
212 Air distributor
301 System boundary
302 Operating medium reservoir
303 Operating medium reservoir
304 Cooling unit
305 Oven
306 Fuel cell
307 Galley trolley
308 Oven racks
309 Accumulator
310 Trash compactor
311 Heat exchanger
312 Galley trolley
401 Energy conversion chain 1
402 Energy conversion chain 2
403 Energy conversion chain 3

What is claimed is:

1. A self-sufficient system being configured as a self-sufficient and self-supplying unit supplying operating medium within the self-sufficient system that is connected to an aircraft structure by a mechanical mounting in an aircraft pressure cabin, the self-sufficient system comprising:
operating medium reservoirs for supplying operating mediums, wherein at least one operating medium allows an energy conversion process into several energy forms on demand;
energy converters for producing energy for subsystems based on the operating mediums, wherein a first energy converter is more efficient than a second energy converter in producing a first energy form, and wherein the second energy converter is more efficient than the first energy converter in producing a second energy form; and
a control station for monitoring and controlling energy demand of the subsystems, that controls one of the first or the second energy converter to produce an energy form to meet the energy demand, and routes energy between the subsystems such that energy derived from the one of the first or the second energy converter is used by separate subsystems,
wherein a subsystem of the system of the self-sufficient system includes a galley, and
wherein the self-sufficient system is supplied with an operating medium in a decentralized fashion by carrying along the operating medium in the self-sufficient system in the operating medium reservoirs, such that the self-sufficient system is completely self-contained within with respect to an operating medium supply of the subsystem.

2. A self-sufficient system according to claim 1, wherein the self-sufficient system further comprises energy storage devices, wherein the energy converters and the energy storage devices convert and store work performed by at least one selected from the group consisting of persons, heat introduced into a cabin environment of the aircraft pressure cabin, and other energy forms such that the energy forms are made available on demand at a different time.

3. A self-sufficient system according to claim 1, wherein the galley includes an oven with catalytic combustion.

4. A self-sufficient system according to claim 3, wherein heat from the oven is generated by methanol.

5. A self-sufficient system being configured as a self-sufficient and self-supplying unit supplying operating medium within the self-sufficient system that is connected to an aircraft structure by a mechanical mounting in an aircraft pressure cabin, the self-sufficient system comprising:
operating medium reservoirs for supplying operating mediums, wherein at least one operating medium allows an energy conversion process into several energy forms on demand;
energy converters for producing energy for subsystems based on the operating mediums, wherein a first energy converter is more efficient than a second energy converter in producing a first energy form, and wherein the second energy converter is more efficient than the first energy converter in producing a second energy form; and
a control station for monitoring and controlling energy demand of the subsystems, that controls one of the first or the second energy converter to produce an energy form to meet the energy demand, and routes energy between the subsystems such that energy derived from the one of the first or the second energy converter is used by separate subsystems,
wherein a subsystem of the system of the self-sufficient system includes one of: a rest compartment, a lavatory or a like compartment for flight or cabin crew or passengers, and
wherein the self-sufficient system is supplied with an operating medium in a decentralized fashion by carrying along the operating medium in the self-sufficient system in the operating medium reservoirs, such that the self-sufficient system is completely self-contained within with respect to an operating medium supply of the subsystem.

6. An aircraft with a self-sufficient system according to claim 1.

7. A method for realizing efficient energy conversion processes within a self-sufficient system supplying operating medium within the self-sufficient system, the method comprising:
obtaining energy forms required for an operation of the self-sufficient system from operating mediums carried along by at least one energy conversion process, such that the self-sufficient system is completely self-sufficient with respect to an operating medium supply, wherein a first energy converter is more efficient than a second energy converter in producing a first energy form, and wherein the second energy converter is more efficient than the first energy converter in producing a second energy form;
monitoring energy demand of subsystems; and control the first and second energy converters to produce an energy form to meet the energy demand, and route energy between the subsystems such that energy derived from one of the first or the second energy converter is used by separate subsystems, wherein a subsystem of the system of the self-sufficient system is installed in an aircraft pressure cabin and includes a galley, and wherein the self-sufficient system is configured as a self-contained within and self-supplying unit of the subsystem that is connected to an aircraft structure by a mechanical mounting.

8. A method according to claim 7, further comprising:

utilizing the first and second energy converters as subsystems that convert energy in accordance with one or more technical principles.

* * * * *